Dec. 9, 1969   E. M. TRENT   3,482,295
TOOLS AND TOOL TIPS OF SINTERED HARD METAL
Filed Nov. 28, 1967

United States Patent Office 3,482,295
Patented Dec. 9, 1969

3,482,295
TOOLS AND TOOL TIPS OF SINTERED
HARD METAL
Edward Moor Trent, Coventry, England, assignor to
Wickman Wimet Limited, Coventry, England, a
British company
Continuation-in-part of application Ser. No. 428,637,
Jan. 28, 1965. This application Nov. 28, 1967, Ser.
No. 686,198
Int. Cl. B23p 15/28; B26d 1/00
U.S. Cl. 29—95                                   7 Claims

ABSTRACT OF THE DISCLOSURE

A metal cutting tip of sintered hard metal consists of a body and a thin layer on the rake face, the thin layer being of hard metal more resistant to cratering than that of the body and providing the cutting edge. The body consists of tungsten carbide and binder metal, with or without titanium carbide, tantalum carbide or similar carbide. The thin layer consists of tungsten carbide, titanium carbide or tantalum carbide or both and a binder metal, the proportion of titanium carbide⊕tantalum carbide in the thin layer being higher than that (if any) in the body.

This application is a continuation-in-part of application Ser. No. 428,637, filed July 28, 1965 and now abandoned.

The invention relates to cutting tools and tool tips of sintered hard metal consisting essentially of metal carbide and a metal binder of the iron group. As is well known, such a cutting tool is used for machining metal, and it may either be wholly composed of the hard metal or (more frequently) consist of a holder furnished with a tip of the hard metal.

Figure 1:
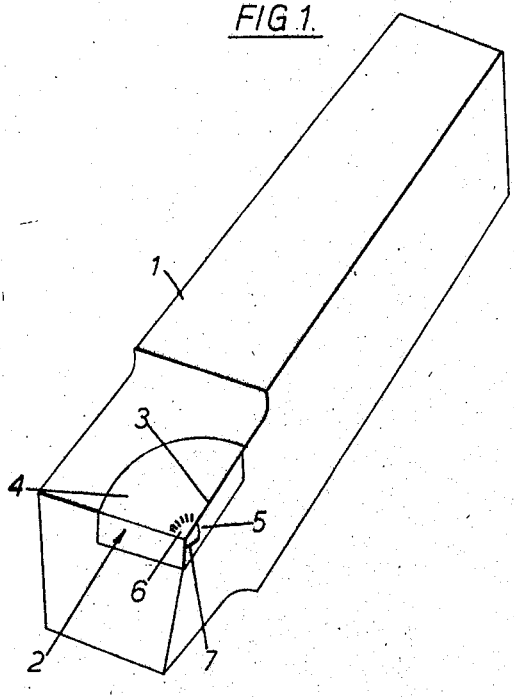

A typical cutting tool is shown in FIGURE 1 of the accompanying drawings. The tool comprises a steel holder 1 and a hard metal tip 2, which presents a cutting edge 3 at the intersection of a rake face 4 over which the chips or swarf move and a flank 5 down which the surface of the work from which a chip has been cut moves.

The hard metal most extensively used for the tip in such a tool is composed of tungsten carbide and cobalt, most commonly of 94% tungsten carbide and 6% cobalt. It is known that a tool tip of this metal wears rapidly on the rake face when cutting steel at the speeds commonly used in industry. Such rapid wear is known as cratering, and typical cratering is indicated at 6 in FIGURE 1.

The flank of the tip also becomes worn. Typical flank wear is indicated at 7 in FIGURE 1. In cutting steel at medium and high speeds very high temperatures are generated and the amounts of flank wear and cratering wear then depend at least in part on diffusion of the material of the tip into the steel. In fact, the temperature near the cutting edge influences tool life in two ways. Increase in temperature increases the rate of diffusion, and thus the wear resulting from it, and also the deformation of the tool edge under the action of cutting forces.

When greater resistance to wear is required in a tool for cutting steel it is common to replace some of the tungsten carbide by one or more carbides of titanium, zirconium and hafnium (elements of the 4th group of the Periodic Table) and niobium and tantalum (elements of the 5th group). In practice titanium carbide or tantalum carbide is nearly always used for this purpose. Tantalum carbide commonly contains a substantial proportion of niobium carbide, for example 25%, and any reference to tantalum carbide is always understood as including whatever niobium carbide is present. In conferring wear resistance titanium carbide is some three times as effective, weight for weight, as tantalum carbide.

Sintered hard metals containing titanium carbide or tantalum carbide or both are usually known as steel-cutting grades. Typical compositions are 86% tungsten carbide, 9% cobalt and 5% titanium carbide; 81% tungsten carbide, 7% cobalt and 12% titanium carbide; and 73% tungsten carbide, 9% cobalt, 10% titanium carbide and 8% tantalum carbide.

Although in these hard metals cobalt can be replaced by other metal of the iron group, in practice it is nearly always used as the binder metal, and for ease of subsequent description reference will be made only to cobalt, although it is to be understood that other binder metal can be used if desired.

The presence of titanium carbide or tantalum carbide in the hard metal greatly reduces the rate of cratering wear. It also reduces the wear on the flank of the tool because the solubility of these carbides in steel or iron at high temperatures is much lower than that of tungsten carbide.

I have observed, however, that the advantage of increase in crater resistance obtained by adding other carbides, such as titanium carbide or tantalum carbide, is partly offset or annulled because the thermal conductivity of the hard metal is thereby reduced, with the result that there is an increase of temperature during machining of metal. In addition, the presence of titanium carbide or tantalum carbide has two other disadvantages. First, under conditions in which wear is caused by a process of attrition or tearing away of small fragments of the tool material, the rate of flank wear is increased. This type of wear occurs nearly always when cutting cast iron and frequently when cutting steel at low speeds, and hard metal composed only of tungsten carbide and cobalt often gives better tool life under such conditions. Second, the toughness of the hard metal is reduced, and accordingly tools and tool tips of the metal are easily damaged during rough machining operations, particularly if the content of titanium carbide or tantalum carbide or both is high.

According to the invention a tool or tool tip of sintered hard metal is composite, comprising a body and a single thin layer on the rake face of the body. This thin layer both provides the cutting edge and extends at least over that part of the rake surface which is liable to cratering. The edge of the thin layer also forms the top of the flank.

The purpose is to ensure that the rake face is resistant to cratering, and that the flank is resistant to wear. Accordingly the body consists of hard metal more resistant to flank wear than the hard metal of the thin layer, which in turn is composed of hard metal more resistant to cratering than the hard metal of the body. The edge of the thin layer 8 should occupy as little of the flank as is feasible.

Figure 2:
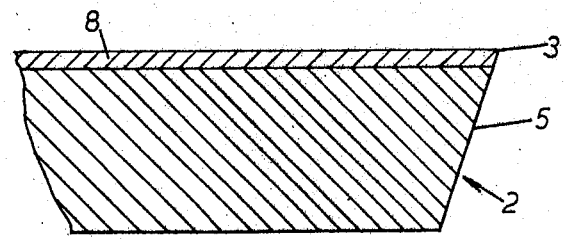

FIGURE 2 of the accompanying drawings is a section through a typical tip according to the invention, showing a thin layer at 8. The minimum practical overall thickness of the tip is 0.125 inch. The thin layer 8 may be from 0.0005″ to 0.040″ thick, and thicknesses of from about 0.012″ to about 0.020″ are most satisfactory. The body 2 may vary considerably in thickness, say from 0.085 to 0.75 inch.

Because as much of the flank as possible should be as resistant as possible to flank wear and of good thermal conductivity, the invention is clearly distinguished from the tip which is shown in the patent to Taylor No. 2,053,977 and which consists of three layers, Taylor's object being to eliminate the risk of breakage by bonding a tantalum carbide layer to a tungsten carbide layer through an intermediate layer containing both tantalum carbide and tungsten carbide. Both the resistance to flank wear and the thermal conductivity of such an intermediate layer are necessarily less than those of the layer beneath it. By providing only a single thin layer I am able to make maximum use of the properties of two different hard metals.

Broadly the composition of the body in my composite tip may be from about 63 to about 94% tungsten carbide, from 0 to about 25% (in total) of carbide of at least one of the elements titanium, zirconium, hafnium, niobium and tantalum, and from about 6 to about 12% binder metal.

The thin layer is composed of from about 10 to about 92% tungsten carbide, from about 5 to about 85% (in total) of carbide of at least one of the elements titanium, zirconium, hafnium, niobium and tantalum and from about 3 to about 15% binder metal.

The compositions must also comply with an overriding requirement, namely that if the body contains carbide of an element or elements of the 4th and 5th groups of the Periodic Table the percentage of such carbide in the thin layer must exceed the percentage of such carbide in the body. When such carbide is titanium carbide, the difference in the percentage should be at least 5.

Most advantageously the thin layer is composed of (i) tungsten carbide, (ii) titanium carbide or tantalum carbide or both, and (iii) cobalt. Thus the thin layer may consist of a hard metal known to be suitable for machining steel.

The body is toughest when it consists only of tungsten carbide and cobalt; at any given cobalt content, any addition of other carbide than tungsten carbide causes a reduction in the toughness of the body.

If the body consists only of tungsten carbide and cobalt, the cobalt content may advantageously be from 8 to 12% and preferably between 9 to 11%, so long as the content of titanium carbide in the thin layer is between 5 and 12%, or, if the titanium carbide is wholly or partly replaced by other carbide of the said element or elements the 4th and 5th groups of the Periodic Table, in an amount equivalent to between 5 and 12%. This can be expressed (for replacement by tantalum carbide) by saying that the content of titanium carbide plus one-third of the content of tantalum carbide is from 5 to 12% while the body is composed of from 92 to 88% tungsten carbide and from 8 to 12% cobalt.

Tools or tool tips according to the invention can be made in various ways. For example, powder of the composition of the body of the tool or tool tip can be put into a mould. If desired this powder can then be pressed at a low pressure. A layer of powder to form the thin layer can be put on top and the whole can then be pressed and sintered in the usual manner.

I have found that when the thin layer contains 5% or more titanium carbide the cobalt with some carbide dissolved in it noticeably migrates from the thin layer into the body during the sintering process. This occurs when the body has the common composition of 94% tungsten carbide and 6% cobalt. As the proportion of titanium carbide in the layer increases, so does the tendency for the cobalt to migrate on sintering. However, it is desirable to make the proportion of titanium carbide or other carbide of the 4th and 5th groups of the Periodic Table in the thin layer high, because the greater this proportion, the greater is the increase in the wear resistance in the cutting of steel at high speeds, and the higher are the cutting speeds which can be used.

The properties of the thin layer are closely associated with the proportion of cobalt remaining in it after sintering. As the proportion of cobalt is increased, so is the toughness of the thin layer, but at the expense of wear resistance and hardness.

The thin layer contains at least 3% cobalt to ensure that it can withstand difficult operating conditions such as shock loading. It is preferred to form the tool or tip so that the thin layer contains between 6% and 10% of cobalt, although for the greatest toughness the cobalt conten in the thin layer can be increased to as high as 15%; in the latter case there is necessarily some loss of cutting properties.

The powders to be used in forming the tip and the thin layer must therefore be selected so that, after migration has occurred, the composition of the thin layer falls within the desired range.

I have further found that it is possible to offset this migration of cobalt by increasing the cobalt content of the body, or by including carbide of one or more of the said elements in the 4th and 5th groups of the Periodic Table in the body, or by both. Increasing the cobalt content alone is effective only when the content of titanium carbide or equivalent carbide in the layer is not too high. I have in fact found that there is a relationship between the wear resistance conferred by titanium or other carbide and its property of promoting migration of cobalt, so that although the migration promoted by a given proportion of tantalum carbide is less than that promoted by the same proportion of titanium carbide, the migration is about the same if the amount of tantalum carbide is equivalent to that of titanium carbide from the point of view of wear resistance.

It is however desirable to increase the content of titanium or other carbide in the thin layer well above 12%. To offset this increase by adding more than about 12% of binder metal to the body is no remedy because the hard metal forming the body then becomes incapable of supporting the compressive loads imposed on a cutting tool, and it then becomes advisable to modify the composition of the body so far as its carbide content is concerned. This is done by introducing into the hard metal of the body titanium carbide or tantalum carbide or both in an amount of not more than 25%. Thus when the sum of the percentage of titanium carbide plus one third of the percentage of tantalum carbide in the thin layer exceeds 12, the body advantageously also contains titanium carbide or tungsten carbide or both, but the sum of percentages of these carbides in the thin layer should be at least twice that in the body.

Some examples will now be given.

Example I

The body of a cutting tool tip was made from a powder mixture of 91% tungsten carbide and 9% cobalt. In making the tip this powder was formed into a compact under low pressure and a layer of hard metal powder composed of 81% tungsten carbide, 12% titanium carbide and 7% cobalt was placed on top of the compact, the assembly being then pressed again at a higher pressure.

The resultant compact was then pre-sintered, sintered and ground to shape to be clamped in a tool holder. After grinding, the layer on the rake face was approximately .008 inch thick, and the body was 0.1795 inch thick, the overall thickness thus being 0.1875 inch.

The tip was used for cutting a cast iron bar 5 inches in diameter with four longitudinal slots each 1 inch wide. This provided a severe test in which the cutting was periodically interrupted, thus subjecting the tool to shock loading. In one test at a surface speed of 300 feet per minute, a feed rate of 0.010 inch per revolution and a depth of cut of 0.125 inch, the tip was used for cutting for a time of 14 minutes. After this test, the tip showed light cratering and the flank wear was on an average 0.011 inch. By way of comparison a tip of the same shape was made from a hard metal alloy containing 6% cobalt and 94% tungsten carbide. This was used on the same bar of cast iron under the same conditions and after 14 minutes of cutting this showed a deep crater, and the flank wear was on the average 0.017 inch.

The test was repeated on another slotted cast iron bar at higher cutting speed and feed. The surface speed was 450 feet per minute, the feed rate was 0.020 inch per revolution and the cutting time was 3½ minutes. In this test the tip containing 6% cobalt and 94% tungsten carbide had a deep crater on the rake face, and the flank wear was on the average 0.016 inch. The composite tip according to the invention showed only light cratering and the flank wear was on the average 0.006 inch.

Example II

Five tips were made with the use of the same powder mixtures as in Example I. Each was 0.1875 inch thick overall; one consisted only of the sintered tungsten carbide and cobalt powder, i.e. had no thin layer; three consisted of layers of the sintered tungsten carbide, titanium carbide and cobalt powder of different thicknesses on a body of the sintered tungsten carbide and cobalt powder; and the last consisted only of the sintered tungsten carbide, titanium carbide and cobalt powder. Each tip was used for machining a steel of EN 24 of the British Standard Specification No. 970. The cutting speed was 700 ft./min. and the feed was 0.0052 inch. The tip with no layer cratered so rapidly and showed such rapid flank wear that the test was stopped after only three minutes. Each of the other tips cut for thirteen minutes. The observed catering and flank wear were as follows:

| Thickness of layer, inch | Depth of rake face cratering in microns | Flank wear in inch |
| --- | --- | --- |
| 0 | 80 | 0.027 |
| 0.014 | 3 | 0.00286 |
| 0.034 | 6 | 0.00338 |
| 0.051 | 6 | 0.00416 |
| 0.1875 | 10 | 0.0052 |

The improvement obtained by the provision of the thin layer is very clearly demonstrated by these figures. They also show that not only flank wear but surprisingly also cratering increases as the thickness of the thin layer increases.

Example III

A tool tip in which the body contained 91% tungsten carbide and 9% cobalt and the surface layer contained 81% tungsten carbide, 12% titanium carbide and 7% cobalt was made as in Example I. The tip was ground to form a negative rake tool tip suitable for being clamped in a tool holder for milling. After grinding the tip, the layer was approximately .010 inch thick, and the body was 0.1795 inch thick.

The tip was clamped in a single-toothed milling cutter and used for cutting a bar of steel containing 0.4% carbon. The peripheral speed of the milling cutter was 550 feet per minute, the feed was 0.005 inch per revolution and the depth of cut 0.15 inch. After cutting for a length of 36 inches, the tool showed light cratering and 0.009 inch flank wear on the average. By way of comparison, a tool containing 10% cobalt, 10% titanium carbide, 2.5% tantalum carbide and 77.5% tungsten carbide was used under the same conditions. After cutting for 36 inches this showed more cratering and the flank wear on the average was 0.012 inch.

Example IV

A tool tip was made by the same process as described in Example I. The layer contained 24.5% titanium carbide, 11% cobalt and 64.5% tungsten carbide. The body contained 10% cobalt, 11% titanium carbide and 79% tungsten carbide. The tip was sintered and ground to form a positive rake tool so that the layer on the rake face was approximately 0.008 inch thick after the grinding. The body was 0.1795 inch thick.

The tip was clamped in a tool holder and used to cut a low-alloy steel at a surface speed of 500 feet per minute, and a feed rate of 0.005 inch per revolution and a depth of cut of 0.020 inch. After cutting for 10 minutes the cratering wear and deformation of the tip were very slight and the flank wear was on the average 0.0027 inch. By way of comparison a tip made from powder of the same composition as the layer was tested under the same conditions. After cutting for 10 minutes the cratering wear was again slight, and the deformation at the nose of the tip was considerably greater and the flank wear was on the average 0.0035 inch.

Example V

To show the importance of choosing hard metals appropriately to avoid migration, a thin layer composed of 64.5% tungsten carbide, 24.5% titanium carbide and 11% cobalt was formed on bodies of three different hard metals, the first (A) consisting of 91% tungsten carbide and 9% cobalt, the second (B) of 86% tungsten carbide, 5% titanium carbide and 9% cobalt, and the third (C) consisting of 77% tungsten carbide, 10% titanium carbide, 3% tantalum carbide and 10% cobalt. In each case the powder of the body was pressed in a steel die at a pressure of about 1 ton per square inch, powder to form the thin layer was placed on the top of the resultant compact, and the assembly was then pressed at about 8 tons per square inch. The compacts so formed were sintered in a vacuum furnace at about 1440° C. for one hour.

On examination of the resultant tool tips, it was found that the thin layer on a body of powder A (containing no titanium carbide) was very porous and contained very little cobalt metal, and this was in the form of isolated pockets. The thin layer on a body of powder B was similar but it contained less porosity and rather more cobalt metal. Neither of these two tips would have been satisfactory in use. On the other hand, the thin layer on a body of powder C was practically free from porosity and appeared to contain a normal amount of cobalt, which was well distributed so that it could act as an effective bond giving the surface layer adequate toughness.

It will be seen that by means of the invention I can provide a tool or tool tip which presents the advantage of low diffusion wear on the rake face and flank with greater toughness than normally accompanies this low wear, which has high enough thermal conductivity to give low flank wear at high speeds and to keep down the tool deformation, and which has a low rate of attrition wear at low speeds. With titanium carbide is include in the hard metal of the body, these advantages are lost to some extent. In particular, the base material becomes less tough and has a lower thermal conductivity, but it is still tougher and more conductive to heat than the surface layer and the advantage is still obtained that tool tips made in this way retain the very high wear resistance of the surface layer, and can be used under more severe conditions of cuting than could tools made only of the composition of the layer.

If the rake face of a tool or tool tip according to this invention is ground after use, the thin layer may be removed. For this reason the invention is particularly applicable to tools or tool tips which will not be resharpened or reground, such as well-known "throw-away" tips. If the tool or tool tip is to be ground on the rake face before it is used, then the thickness of the layer should be increased by the amount which will be removed by grinding.

I claim:

1. A composite metal cutting element of sintered hard metal comprising a body and a thin unitary layer on a rake face of the body, said body being composed of from about 63 to about 94% tungsten carbide, from 0 to about 25% of carbide of metal selected from the group consisting of titanium, zirconium, hafnium, niobium and tantalum, and from about 6 to about 12% binder metal selected from the iron group, said thin layer being composed of from about 10 to about 92% tungsten carbide, from about 5 to about 85% of carbide of metal selected from the group consisting of titanium, zirconium, hafnium, niobium and tantalum and from about 3 to about 15% binder metal selected from the iron group, the percentage of carbide of metal selected from the group consisting of titanium, zirconium, hafnium, niobium and tantalum in said thin layer exceeding that in said body, said element being from about 0.080 to about 0.75 inch thick overall, said thin layer being from about 0.0005 to about 0.040 inch thick, and said thin layer providing the cutting edge of the element and extending over at least that part of the rake surface which is subject to cratering.

2. An element according to claim 1 wherein the binder metal is cobalt.

3. An element according to claim 1 wherein said thin layer has a thickness of from about 0.012 inch to about 0.020 inch.

4. An element according to claim 1 in which the body is composed of from 92 to 88% tungsten carbide and from 8 to 12% cobalt, and the thin layer is composed of tungsten carbide, titanium carbide and a binder metal, the content of titanium carbide being from 5 to 12%.

5. An element according to claim 1 in which the body is composed of from 91 to 89% tungsten carbide and from 9 to 11% cobalt, and the thin layer is composed of tungsten carbide, titanium carbide and a binder metal, the content of titanium carbide being from 5 to 12%.

6. An element according to claim 1 in which said body is composed of from 92 to 88% tungsten carbide and from 8 to 12% cobalt, and said thin layer is composed of tungsten carbide, titanium carbide, tantalum carbide and a binder metal, the content of titanium carbide plus one third of the content of tantalum carbide being from 5 to 12%.

7. An element according to claim 1 in which the body contains at least one carbide of a metal selected from the group consisting of titanium and tantalum, and the thin layer contains at least one metal selected from the group consisting of titanium and tantalum, the sum of the percentage of titanium carbide and one third of the percentage of tantalum carbide in the thin layer exceeding 12 and being at least twice in the sum of these percentages in the body.

References Cited
UNITED STATES PATENTS

| | | | |
|---|---|---|---|
| 1,936,435 | 11/1933 | Kelley | 29—95 X |
| 1,937,185 | 11/1933 | Balke | 29—95 X |
| 1,973,428 | 9/1934 | Comstock | 29—95 X |
| 2,053,977 | 9/1936 | Taylor | 29—95 |

HARRISON L. HINSON, Primary Examiner